United States Patent [19]
Horrion et al.

[11] Patent Number: 5,852,118
[45] Date of Patent: Dec. 22, 1998

[54] BLOCK COPOLYMERS OF POLYOLEFINS WITH POLYURETHANES, COPOLYESTERS OR COPOLYAMIDES AND THEIR USE

[75] Inventors: Jacques Horrion, Tilff; Trazollah Ouhadi, Liege, both of Belgium

[73] Assignee: Advanced Elastomer Systems, L.P., Akron, Ohio

[21] Appl. No.: 920,190

[22] Filed: Aug. 25, 1997

[30] Foreign Application Priority Data

Oct. 15, 1996 [EP] European Pat. Off. ............. 96116483

[51] Int. Cl.$^6$ ...................................... C08L 53/00
[52] U.S. Cl. ........................... 525/90; 525/88; 525/92 C
[58] Field of Search ................................ 525/90, 88, 92 C

[56] References Cited

U.S. PATENT DOCUMENTS

| | | | |
|---|---|---|---|
| 4,409,365 | 10/1983 | Coran et al. | 525/78 |
| 4,883,837 | 11/1989 | Zabrocki | 525/66 |
| 4,975,207 | 12/1990 | Lee | 524/494 |
| 5,149,739 | 9/1992 | Lee | 525/66 |
| 5,194,505 | 3/1993 | Brugel | 525/131 |
| 5,242,977 | 9/1993 | Franke et al. | 525/90 |
| 5,274,023 | 12/1993 | Takahashi et al. | 524/425 |
| 5,605,961 | 2/1997 | Lee et al. | 525/66 |

FOREIGN PATENT DOCUMENTS

| | | |
|---|---|---|
| 0 657 502 A1 | 6/1995 | European Pat. Off. . |
| 0 732 349 A2 | 9/1996 | European Pat. Off. . |

*Primary Examiner*—Nathan M. Nutter
*Attorney, Agent, or Firm*—William A. Skinner

[57] ABSTRACT

The present invention relates to new block copolymers of chemically modified polyolefins and thermoplastic polyurethanes, copolyesters or copolyamides a method for the preparation of said block copolymers and their use for compatibilizing blends of polar and non-polar thermoplastic elastomers. The block copolymers according to the present invention can further be used for promoting the adhesion of thermoplastic elastomers onto various polar engineering resins.

3 Claims, No Drawings

BLOCK COPOLYMERS OF POLYOLEFINS WITH POLYURETHANES, COPOLYESTERS OR COPOLYAMIDES AND THEIR USE

The present invention relates to block copolymers of chemically modified polyolefins, polar thermoplastic polyurethanes (TPU), copolyesters or copolyamides, a method for their preparation and a method for the compatibilization of thermoplastic elastomer blends. Additionally the present invention relates to a method for promoting the adhesion of thermoplastic elastomers (TPE) onto various polar engineering resins using the block copolymers of the invention.

Thermoplastic elastomers can be in nature polar (for example, copolyesters, copolyamides, polyurethanes) or non-polar (blend of polyolefinic thermoplastic like PP, PE with polyolefin rubbers like EPM, EPDM, NR, BD with the rubber phase fully or partially vulcanized, i.e., so called DVAs; SEBS polymer etc). Blending of two or more polar TPEs or two or more non-polar TPEs can be done without significant loss in properties because their solubility parameters are close and therefore their blend is compatible/miscible. For example U.S. Pat. No. 4,409,365 describes blends of PP/EPDM DVAs (non-polar) and PP/NBR DVAs (non-polar) provided they have a common thermoplastic component.

The situation is completely different when blends of polar and non-polar TPEs have to be prepared. Because of their inherent incompatibility, poor interfacial adhesion exists between the components resulting in poor overall mechanical properties. To alleviate this problem, a compatibilizer is usually incorporated into the blend. Specifically located at the interface of the two phases, it improves the interfacial adhesion by connecting the phases together through strong anchoring in both phases. The resulting compositions have improved mechanical properties. The design/selection of the compatibilizer is critical to optimize its efficiency in the blend. Block copolymers where each segment is compatible/miscible with one phase are preferred.

U.S. Pat. No. 4,883,837 discloses compatibilized blends comprising a non-polar polyolefin and a polar thermoplastic polyurethane, compatibilized with a compatibilizing amount of at least one modified polyolefin. The modified polyolefin is used to overcome the incompatibility between the non-polar polyolefin and the polar thermoplastic polyurethanes. The compatibilizing modified polyolefin is defined as a random, block or graft olefin copolymer having in the main side chain thereof a functional group selected from the class consisting of carboxylic acid, carboxylate ester, carboxylic acid anhydride, carboxylate salts, amine, epoxy, hydroxy and acyloxy. Preferred is a maleic anhydride modified polyolefin. Said modified polyolefin is contained in said composition in an amount of from 10 to 35 weight %.

U.S. Pat. No. 4,975,207 discloses the use of carbonyl modified polyolefins to improve the impact resistant properties, especially at low temperature, melt processing properties, and dimensional stability of thermoplastic elastomer polyurethanes, which may be reinforced. The carbonyl modified polyolefins are homopolymers or copolymers made from one or more monomers having from 2 to 6 carbon atoms with the carbonyl group having from 1 to 8 carbon atoms. The amount of carbonyl modified polyolefin is generally from 1 to 30 parts by weight for every 100 parts by weight of the thermoplastic polyurethane elastomer.

U.S. Pat. No. 5,149,739 discloses a thermoplastic elastomer polyurethane having improved properties such as flexural modulus, flexural strength and improved melt-processability. The polyurethane contains either an unmodified and/or a modified polyolefin and optionally reinforcing fibers. The modified polyolefin is a graft copolymer containing a homopolymer or copolymer backbone made from one or more monomers having from 2 to 6 carbon atoms and containing carbonyl compounds. The amount of the modified and/or unmodified polyolefin is generally up to 40 parts by weight for every 100 parts by weight of the polyurethane.

U.S. Pat. No. 5,194,505 discloses polyurethane compositions comprising chlorosulfonated olefin polymer blocks. The chlorosulfonated olefin is hydrophobic and the reaction product of a chlorosulfonated olefin polymer, a compound selected from polyols, hydrocarbon primary or secondary polyamines, condensation products of said polyamines with aliphatic, cycloaliphatic or aromatic polycarboxylic acids and mixtures thereof, and a polyisocyanate.

U.S. Pat. No. 5,274,023 discloses a thermoplastic polyurethane resin composition which contains a thermoplastic polyurethane resin and a carboxyl group modified polyolefin resin as its components.

It is an object of the present invention to provide a new class of block copolymers which as such have improved properties and which are useful for compatibilizing blends of polar and non-polar thermoplastic elastomers and in particular blends of polyolefins or polyolefin based dynamically vulcanized alloys (DVA) with polar thermoplastic elastomers such as polyurethanes, polar copolyesters or polar copolyamides, as well as blends of said polyolefins with engineering resins.

It is a further object of the present invention to provide blends of polar and non-polar thermoplastic elastomers and in particular blends of polyolefins or polyolefin based dynamically vulcanized alloys with the polar thermoplastic elastomers/engineering resins mentioned above, said blends having improved mechanical properties and being compatibilized with a suitable compatibilizer. The blends should be improved with respect to their modulus, tensile at break and elongation at break.

It is another object of the present invention to provide thermoplastic elastomers having an improved adhesion onto polar engineering resins.

These objects and further objects which are evident from the present invention are solved by a block copolymer comprising (a) 5 to 95% by weight, based on the amount of (a)+(b), of a chemically modified polyolefin, (b) 95 to 5% by weight, based on the amount of (a)+(b), of a thermoplastic polyurethane (TPU), copolyester or copolyamide, and (c) 0.05 to 5.0 parts by weight, based on 100 parts by weight of (a)+(b), of one or more coupling agent(s).

It has surprisingly been found that the block copolymer of the present invention has excellent and well balanced physical properties. It has further been found that the block copolymer of the present invention is very useful for the compatibilization of blends selected from polar/non-polar thermoplastic elastomers, non-polar polyolefins/polar thermoplastic elastomers and non-polar thermoplastic elastomers/engineering resins and in particular blends of polyolefins or polyolefin based dynamically vulcanized alloys with polar thermoplastic polyurethanes. The resulting blends have improved and well balanced properties.

Additionally it has been found that the block copolymer of the present invention if added to thermoplastic elastomers yields and improved adhesion of said modified TPEs onto various polar engineering resins.

A. The modified polyolefin

The term "modified polyolefin" means a random, block, or graft olefin copolymer having in a main or side chain thereof a functional group such as carboxylic acid; $C_1$ to $C_8$ carboxylate ester and isomeric forms thereof; carboxylic acid anhydride; carboxylate salts formed from the neutralization of carboxylic acid group(s) with metal ions from Groups I, II, III, IV-A and VIII of the periodic table, illustratively including sodium, potassium, lithium, magnesium, calcium, iron, nickel, zinc, and aluminum, and mixtures thereof; amide; epoxy; hydroxy; amino; $C_2$ to $C_6$ acyloxy such as acetoxy, propionyloxy, butyryloxy; and the like; wherein said functional group is part of an unsaturated monomer precursor which is either copolymerized with an olefin monomer or grafted onto a polyolefin to form said modified polyolefin.

The modified polyolefin component defined above is represented by a large number of polyolefin random, block, and graft copolymers which have long been known in the art and, for the most part, are commercially available. Otherwise they are readily prepared using the conventional techniques for polymerizing olefin monomers; see Preparative Methods of Polymer Chemistry, W. R. Sorenson and T. W. Campbell, 1961, Interscience Publishers, New York, N.Y. Illustrative but non-limiting of the basic olefin monomers for copolymerization with the functional group containing unsaturated monomers are ethylene, propylene, butylene, mixtures of ethylene/propylene, mixtures of ethylene/butylene, mixtures of propylene/butylene, mixtures of ethylene/$C_3$ to $C_{12}$ $\alpha,\beta$-unsaturated alkenes, and the like. Alternatively, the above illustrative monomers or mixtures are first polymerized to their corresponding polyolefins prior to grafting with said functional group containing monomers. A preferred class of modified polyolefin comprises a modified polyethylene, that is to say a polyethylene copolymer wherein the major molar proportion (at least 50 percent) of the copolymer consists of ethylene units copolymerized with at least one unsaturated monomer having a functional group substituent defined above, or a polyethylene (HDPE, LDPE or LLDPE) having grafted thereon a minor molar proportion (about 0.005 to 5 percent) of said at least one unsaturated monomer having the functional group substituent.

As illustrative embodiments of modified polyolefins in copolymer form are those derived from the copolymerization of any one of the olefin monomers set forth above but preferably ethylene in the minimum molar proportions of at least 50 percent with a vinyl functional group containing monomer such as acrylic acid, methacrylic acid, maleic acid, maleic anhydride, acrylamide, methacrylamide, glycidyl acrylate, glycidyl methacrylate, vinyl acetate, vinyl butyrate, methyl acrylate, ethyl acrylate, butyl acrylate, 2-hydroxyethyl acrylate, sodium acrylate, zinc acrylate, the ionic hydrocarbon polymers from the polymerization of $\alpha$-olefins with $\alpha,\beta$-ethylenically unsaturated carboxylic acids as described in U.S. Pat. No. 3,264,272 whose disclosure is incorporated herein by reference, and the like. It will be understood that in the case of the olefin/vinyl acid copolymers that the carboxylic acid groups can be wholly or partially converted to metal salts (i.e., sodium, potassium, zinc) after formation of the copolymer. Such ionic copolymers are collectively recognized by the term "ionomers". The vinyl functional monomers can be used in combination. Furthermore, mixtures of any of these modified polyolefins can be used.

As illustrative embodiments of modified polyolefins in grafted form are those derived from the graft polymerization of any one of the vinyl functional group containing monomers set forth above (preferably maleic anhydride) onto any one of the olefin polymers set forth above but preferably polyethylene (HDPE, LDPE, LLDPE). The proportions of said graft monomers are preferably within the molar range of 0.005 to 5 percent set forth above. As with the copolymers above, mixtures or combinations can be employed. Further, the vinyl functional group containing monomers can be grafted onto the modified polyolefin copolymers discussed above. A preferred embodiment of such a polymer type includes the product obtained by grafting maleic acid or anhydride onto an ethylene/vinyl carboxylate copolymer or the saponified copolymer derived from ethylene/vinyl acetate. The graft-copolymerization of the unsaturated carboxylic acid or its functional derivative or another functional group-containing vinyl monomer onto the olefin polymer can be conducted using various methods. For example, the olefin polymer, the graft monomer and a free-radical initiator are incorporated in a solution or suspension of the olefin polymer in a suitable solvent. It is also possible to conduct the graft copolymerization in the presence of the thermoplastic polyurethane elastomer, i.e., after being blended with the thermoplastic polyurethane elastomer.

It will be understood by those skilled in the art that the modified polyolefins can be prepared using any combination of monomer reactants in either a copolymer, grafted copolymer, or copolymer-grafted copolymer configuration. However, a most preferred class of modified polyolefin comprises a copolymer or graft copolymer of ethylene or polyethylene (particularly LDPE or LLDPE) with at least one vinyl monomer having a functional group selected from carboxylic acid, carboxylate salts, dicarboxylic acid or anhydride thereof, carboxylate ester, and acyloxy, and mixtures of said modified polyolefins. Particularly, preferred species of modified polyethylene in this class are ethylene/vinyl acetate copolymer, ethylene/methylacrylate copolymer, ethylene/methacrylic acid copolymer, ethylene/acrylic acid copolymer, ethylene/maleic anhydride graft copolymer, maleic anhydride grafted ethylene/vinyl acetate copolymer, and mixtures thereof in any combination and proportions.

Another group of modified polyolefins which can be used in terms of the present invention either alone or in combination with the modified polyolefins mentioned above are styrene/butadiene/styrene-block copolymer (SBS) and its hydrogenated form, i.e., SEBS block-copolymer grafted with the functional grafting group mentioned above.

Specific examples of said grafted modified polyolefin are polypropylene or ethylene propylene rubber grafted with anhydride, acid or primary or secondary amine, ethylene acrylic acid copolymers.

The modified polyolefin is present in the block copolymer according to the invention preferably in amounts from 20 to 80 percent by weight, most preferably from 30 to 70 percent by weight, based on the total amount of the modified polyolefin (a) and the thermoplastic polyurethane, copolyester or copolyamide.

Best block copolymers are formed when the amount of the reactive groups of the polyolefin, the coupling agent and the reactive group of the thermoplastic polyurethanes are the same, i.e., when the stoichiometric ratio is used.

B. The thermoplastic polyurethane/copolyester/copolyamide

1. Thermoplastic polyurethane

The polyurethane component has no limitation in respect of its formulation other than the requirement that it be thermoplastic in nature which means it is prepared from substantially difunctional ingredients, i.e., organic diisocyanates and components being substantially difunctional in active hydrogen containing groups. However, oftentimes minor proportions of ingredients with functionalities higher than two may be employed. This is particularly true when using extenders such as glycerin, trimethylolpropane, and the like. Such thermoplastic polyurethane compositions are generally referred to as TPU materials. Accordingly, any of the TPU materials known in the art can be employed in the present blends. For representative teaching on the preparation of TPU materials see Polyurethanes: Chemistry and Technology, Part II, Saunders and Frisch, 1964, pp 767 to 769, Interscience Publishers, New York, N.Y. and Polyurethane Handbook, Edited by G. Oertel 1985, pp 405 to 417, Hanser Publications, distributed in U.S.A. by Macmillan Publishing Co., Inc., New York, N.Y. For particular teaching on various TPU materials and their preparation see U.S. patent publications U.S. Pat. Nos. 2,929,800; 2,948,691; 3,493,634; 3,620,905; 3,642,964; 3,963,679; 4,131,604; 4,169,196; Re 31,671; 4,245,081; 4,371,684; 4,379,904; 4,447,590; 4,523,005; 4,621,113; 4,631,329; and 4,883,837.

The preferred TPU is a polymer prepared from a mixture comprising at least one organic diisocyanate, at least one polymeric diol and at least one difunctional extender. The TPU may be prepared by the prepolymer, quasi-prepolymer, or one-shot methods in accordance with the methods described in the references above.

Any of the organic diisocyanates previously employed in TPU preparation can be employed including blocked or unblocked aromatic, aliphatic, and cycloaliphatic diisocyanates, and mixtures thereof.

Illustrative isocyanates but non-limiting thereof are methylenebis(phenyl isocyanate) including the 4,4'-isomer, the 2,4'-isomer and mixtures thereof, m- and p-phenylene diisocyanates, chlorophenylene diisocyanates, α,α'-xylylene diisocyanate, 2,4- and 2,6-toluene diisocyanate and the mixtures of these latter two isomers which are available commercially, tolidine diisocyanate, hexamethylene diisocyanate, 1,5-naphthalene diisocyanate, isophorone diisocyanate and the like; cycloaliphatic diisocyanates such as methylenebis(cyclohexyl isocyanate) including the 4,4'-isomer, the 2,4'-isomer and mixtures thereof, and all the geometric isomers thereof including trans/trans, cis/trans, cis/cis and mixtures thereof, cyclohexylene diisocyanates (1,2-; 1,3-; or 1,4-), 1-methyl-2,5-cyclohexylene diisocyanate, 1-methyl-2,4-cyclohexylene diisocyanate, 1-methyl-2,6-cyclohexylene diisocyanate, 4,4'-isopropylidenebis(cyclohexyl isocyanate), 4,4'-diisocyanatodicyclohexyl, and all geometric isomers and mixtures thereof and the like. Also included are the modified forms of methylenebis(phenyl isocyanate). By the latter are meant those forms of methylenebis(phenyl isocyanate) which have been treated to render them stable liquids at ambient temperature (about 20° C.). Such products include those which have been reacted with a minor amount (up to about 0.2 equivalents per equivalent of polyisocyanate) of an aliphatic glycol or a mixture of aliphatic glycols such as the modified methylenebis(phenyl isocyanates) described in U.S. Pat. Nos. 3,394,164; 3,644,457; 3,883,571; 4,031,026; 4,115,429; 4,118,411; and 4,299,347. The modified methylenebis(phenyl isocyanates) also include those which have been treated so as to convert a minor proportion of the diisocyanate to the corresponding carbodiimide which then interacts with further diisocyanate to form uretone-imine groups, the resulting product being a stable liquid at ambient temperatures as described, for example, in U.S. Pat. No. 3,384,653. Mixtures of any of the above-named polyisocyanates can be employed if desired.

Preferred classes of organic diisocyanates include the aromatic and cycloaliphatic diisocyanates. Preferred species within these classes are methylenebis(phenyl isocyanate) including the 4,4'-isomer, the 2,4'-isomer, and mixtures thereof, and methylenebis (cyclohexyl isocyanate) inclusive of the isomers described above.

The polymeric diols which can be used are those conventionally employed in the art for the preparation of TPU elastomers. The polymeric diols are responsible for the formation of soft segments in the resulting polymer and advantageously have molecular weights (number average) falling in the range of 400 to 4 000 and preferably 500 to 3 000. It is not unusual, and, in some cases, it can be advantageous to employ more than one polymeric diol. Exemplary of the diols are polyether diols, polyester diols, hydroxy-terminated polycarbonates, hydroxy-terminated polybutadienes, hydroxy-terminated polybutadiene-acrylonitrile copolymers, hydroxy-terminated copolymers of dialkyl siloxane and alkylene oxides such as ethylene oxide, propylene oxide and the like, and mixtures in which any of the above polyols are employed as major component (greater than 50% w/w) with amino-terminated polyethers and amino-terminated polybutadiene-acrylonitrile copolymers.

Illustrative of polyether polyols are polyoxyethylene glycols, polyoxypropylene glycols which, optionally, have been capped with ethylene oxide residues, random and block copolymers of ethylene oxide and propylene oxide; polytetramethylene glycol, random and block copolymers of tetrahydrofuran and ethylene oxide and/or propylene oxide, and products derived from any of the above reaction with di-functional carboxylic acids or ester derived from said acids in which latter case ester interchange occurs and the esterifying radicals are replaced by polyether glycol radicals. The preferred polyether polyols are random and block copolymers of ethylene and propylene oxide of functionality approximately 2.0 and polytetramethylene glycol polymers of functionality about 2.0.

Illustrative of polyester polyols are those prepared by polymerizing ε-caprolactone using an initiator such as ethylene glycol, ethanolamine, and the like; and those prepared by esterification of polycarboxylic acids such as phthalic, terephthalic, succinic, glutaric, adipic, azelaic, and the like; acids with polyhydric alcohols such as ethylene glycol, butanediol, cyclohexanedimethanol, and the like.

Illustrative of the amine-terminated polyethers are the aliphatic primary di-amines structurally derived from polyoxypropylene glycols. Polyether diamines of this type are available from Jefferson Chemical Company under the trademark JEFFAMINE®.

Illustrative of polycarbonates containing hydroxyl groups are those prepared by reaction of diols such as propane-1, 3-diol, butane-1,4-diol, hexan-1,6-diol, 1,9-nonanediol, 2-methyloctane-1,8-diol, diethylene glycol, triethylene glycol, dipropylene glycol, and the like, with diarylcarbonates such as diphenylcarbonate or with phosgene.

Illustrative of the silicon-containing polyethers are the copolymers of alkylene oxides with dialkylsiloxanes such as dimethylsiloxane, and the like; see, for example, U.S. Pat. No. 4,057,595 or U.S. Pat. No. 4,631,329 cited supra.

Illustrative of the hydroxy-terminated polybutadiene copolymers are the compounds available under the tradename Poly BD Liquid Resins. Illustrative of the hydroxy- and amine-terminated butadiene/acrylonitrile copolymers are the materials available under the trade name HYCAR hydroxyl-terminated (HT) liquid polymers and amine-terminated (AT) liquid polymers, respectively. Preferred diols are the polyether and polyester diols set forth above.

The difunctional extender employed can be any of those known in the TPU art disclosed above. Typically the extenders can be aliphatic straight and branched chain diols having from 2 to 10 carbon atoms, inclusive, in the chain. Illustrative of such diols are ethylene glycol, 1,3-propanediol, 1,4-butanediol, 1,5-pentanediol, 1,6-hexanediol, neopentyl glycol, and the like; 1,4-cyclohexandimethanol; hydroquinonebis-(hydroxyethyl)ether, cyclohexylenediols (1,4-,1,3-, and 1,2-isomers), isopropylidenebis (cyclohexanols); diethylene glycol, dipropylene glycol, ethanolamine, N-methyl-diethanolamine, and the like; and mixtures of any of the above. As noted previously, in some cases minor proportions (less than about 20 equivalent percent) of the difunctional extender may be replaced by trifunctional extenders without detracting from the thermoplasticity of the resulting TPU; illustrative of such extenders are glycerol, trimethylolpropane, and the like.

While any of the diol extenders described and exemplified above can be employed alone, or in admixture, it is preferred to use 1,4-butanediol, 1,6-hexanediol, neopentyl glycol, 1,4-cyclohexanedimethanol, ethylene glycol, and diethylene glycol, either alone or in admixture with each other or with one or more aliphatic diols previously named. Particularly preferred diols are 1,4-butanediol, 1,6-hexanediol, and 1,4-cyclohexanedimethanol.

The equivalent proportions of polymeric diol to said extender can vary considerably depending on the desired hardness for the TPU product. Generally speaking, the proportions fall within the respective range of from about 1:1 to about 1:20, preferably from about 1:2 to about 1:10. At the same time the overall ratio of isocyanate equivalents to equivalents of active hydrogen containing materials is within the range of 0.90:1 to 1.10:1, and preferably, 0.95:1 to 1.05:1.

The TPU's can be prepared by conventional methods which are known to the artisan, for instance from U.S. Pat. No. 4,883,837 and the further references cited therein.

2. Thermoplastic copolyesters

Instead of the thermoplastic polyurethane thermoplastic copolyester elastomers can be employed.

The thermoplastic polyester elastomer (A) is a polyester block copolymer and has, in the polymer chain, (A-1) a high-melting crystalline segment composed mainly of an aromatic polyester unit and (A-2) a low-melting polymer segment composed mainly of an aliphatic polyether unit and/or an aliphatic polyester unit.

The aromatic polyester unit in the high-melting crystalline segment (A-1) (which is a hard segment) is derived from an acid component and a glycol component. The acid component is substantially terephthalic acid and/or 2,6-naphthalenedicarboxylic acid. As the acid component, there may be used, in combination with terephthalic acid and/or 2,6-naphthalenedicarboxylic acid, a small amount of other aromatic dicarboxylic acid (e.g., isophthalic acid) or an aliphatic dicarboxylic acid (e.g., adipic acid, sebacic acid, cyclohexane-1,4-dicarboxylic acid, dimer acid).

The glycol component constituting the aromatic polyester unit is a glycol of 2–12 carbon atoms, such as ethylene glycol, propylene glycol, tetramethylene glycol, neopentyl glycol, hexanediol, decanediol or the like. The lower limit of the melting point of the high-melting crystalline segment (A-1) is generally 150° C. or more, preferably 170° C., more preferably 190° C. or more.

The aliphatic polyether unit in the low-melting polymer segment (A-2) (which is a soft segment) is derived from a polyalkylene glycol. The polyalkylene glycol is, for example, polyethylene glycol, polypropylene glycol, polytetramethylene glycol or polyethylene glycol-polypropylene glycol block copolymer. Of these, polytetramethylene glycol is particularly preferable.

These glycols have a carbon atom number: oxygen atom number ratio of 2 to 4.5, and can be used alone or in admixture.

The aliphatic polyester unit, which is another unit in the low-melting polymer segment (A-2), is derived from an aliphatic dicarboxylic acid as a main acid component and a glycol. The aliphatic dicarboxylic acid as a main acid component is, for example, succinic acid, adipic acid, sebacic acid or decanedicarboxylic acid. The aliphatic dicarboxylic acid may be used in combination with a small amount of an aromatic dicarboxylic acid (e.g., isophthalic acid).

The glycol component constituting the aliphatic polyester unit is a glycol of 2–12 carbon atoms. Its specific examples are the same as those mentioned for the glycol component constituting the aromatic polyester unit of the high-melting crystalline segment (A-1).

The aliphatic polyester unit is obtained by polycondensing the above aliphatic dicarboxylic acid and the above glycol by an ordinary process. It may be a homopolyester, a copolyester, or a polylactone (e.g., a poly-ε-caprolactone) obtained by subjecting a cyclic lactone to ring-opening polymerization. The upper limit of the melting point of the aliphatic polyester unit is not critical, though it is preferably 130° C. or less, particularly preferably 100° C. or less.

The molecular weight of the low-melting polymer segment (A-2) is usually 400–6,000.

The weight ratio of the high-melting crystalline segment (A-1) to the low-melting polymer segment (A-2) in the thermoplastic polyester elastomer (A) is preferably 95/5–5/95, more preferably 70/30–30/70.

As the thermoplastic polyester elastomer (A), an elastomer having a softening point of 100° C. or more is particularly appropriate.

The polyester block copolymer which is used particularly preferably as the thermoplastic polyester elastomer (A), is derived from a polytetramethylene terephthalate or a polytrimethylene terephthalate-2,6-naphthalate as the high-melting crystalline sequent (A-1) and an aliphatic polyether such as polytetramethylene glycol or the like or an aliphatic polyester such as polytetramethylene adipate, poly-ε-caprolactone or the like as the low-melting polymer sequent (A-2). The polyester block copolymer may contain, as part of the dicarboxylic acid and the glycol, polyfunctional components such as polycarboxylic acid, polyfunctional hydroxy compound, hydroxy acid and the like. The polyfunctional components are used in the copolymer in amounts of 3 mole % or less and exhibit a high thickening effect. The polyfunctional components include, for example, trimetallitic acid, trimesic acid, pyromellitic acid, benzophenonetetracarboxylic acid, glycerine, pentaerythritol, and their esters and anhydrides.

The thermoplastic polyester elastomer (A) can be produced by an ordinary polymerization process. Preferable processes include a process which comprise heating an aromatic dicarboxylic acid or a dimethyl ester thereof and a low-melting sequent-formable diol at about 150°–260° C. in the presence of a catalyst to subject them to esterification reaction or ester exchange reaction and then subjecting the reaction product to polycondensation reaction under vacuum while removing the excessive low-molecular diol to obtain a thermoplastic elastomer; a process which comprises a high-melting polyester sequent-formable prepolymer and a low-melting polymer segment-formable prepolymer both prepared in advance, with a bifunctional chain extender reactive with the terminal groups of the prepolymers, subjecting the prepolymers and the chain extender to reaction and keeping the system under high vacuum to remove volatile components to obtain a thermoplastic polyester elastomer; a process which comprises heat-mixing a high-melting polyester of high polymerization degree with a lactone with heating to subject them to ring-opening polymerization of lactone and ester exchange reaction simultaneously to obtain a thermoplastic polyester elastomer, and processes similar thereto.

3. Copolyamides

Another alternative for the thermoplastic elastomers are thermoplastic copolyamides, and in detail polyether block amides obtained by the molten state polycondensation reaction of polyetherdiol blocks and dicarboxylic polyamide blocks. Thermoplastic copolyamides and the method of their manufacture are known in the art and it is referred to a comprehensive review in Chapter 9B in "Thermoplastic Elastomers", edited N. R. Legge, G. Holden, H. E. Schroeder, Hanser publishers, 1987 and the references cited therein.

The polyetherdiol blocks are derived from dihydroxypolyoxyethylene, dihydroxypolyoxypropylene and dihydroxypolyoxytetramethylene. The polyamide precursors can be selected from $C_4$ to $C_{18}$, preferably from $C_6$ to $C_{18}$ amino acids or lactams, $C_4$ to $C_{18}$, preferably $C_6$ to $C_{18}$ dicarboxylic acids and diamines. The melting point of the thermoplastic copolyamides which can be used according to the present invention ranges from 120° to 210° C., preferably from 140° to 210° C. The respective copolyamides are commercially available under the designation PEBAX.

Preferably the amount of the thermoplastic polyurethane, copolyester or copolyamide in the block copolymer is from 80 to 20 percent by weight, most preferably from 70 to 30 percent by weight, based on the amount of the chemically modified polyolefin (a)+thermoplastic polyurethane, copolyester or copolyamide.

C. The coupling agent

The coupling agent (c) is represented by blocked or unblocked aromatic, aliphatic and cycloaliphatic diisocyanates and mixtures thereof. Illustrative isocyanates which can be used as coupling agent are those mentioned above in context with the preparation of the thermoplastic polyurethane. Also included in this definition are polyurethane prepolymers containing isocyanate groups at both ends of the polymer chain.

A combination of the isocyanate coupling agents with another coupling agent may be required in case that the functional group on the modified polyolefin does not react with the isocyanate group of the isocyanate coupling agent. Such co-coupling agents are selected from the group of primary or secondary diamines, diols, diepoxides, amino/hydroxy and amino/epoxy compounds. Said co-coupling compounds may be linear or branched aliphatic or aromatic in structure comprising up to 18, preferably up to 12 carbon atoms.

It is evident that in cases in which said co-coupling agent is used it has to be used in an approximately equimolar amount relative to the coupling agent.

According to the invention one or more coupling agent(s) can be used. Preferably the amount of the coupling agent(s) is from 0.05 to 5 parts by weight, most preferably from 0.1 to 4 parts by weight based on 100 parts by weight of chemically modified polyolefin (a) and thermoplastic polyurethane, copolyester or copolyamide.

D. Preparation of the block copolymer

The block copolymer according to the present invention is obtainable by reactive processing of a mixture comprising (a) the chemically modified polyolefin, (b) the thermoplastic polyurethane the copolyester or copolyamide and (c) the coupling agent(s) in the amounts indicated above.

In detail the block copolymers according to the present invention are prepared by melt-mixing, i.e., reactive processing the polymers together in the presence of the coupling agent(s) in an internal mixer, a single screw extruder, a co- or counter rotating twin-screw extruder, an open mill or any other type of equipment suitable and known in the art. The coupling agent(s) can also be added after the polymers have been molten and blended. The reaction temperature depends on the melting-point of the polar polymer and is between 150° C. to 250° C., preferably between 180° C. and 230° C.

The block copolymers according to the present invention comprising (a) the chemically modified polyolefin, (b) the thermoplastic polyurethane, copolyester or copolyamide and (c) the coupling agent(s) have significantly improved mechanical properties compared to blends comprising a non-polar thermoplastic (PP) and a thermoplastic polyurethane. The poor properties of the latter blend is due to the lack of compatibility and interfacial adhesion between the two polymers. The significant improvement in the mechanical properties of the compatibilized blends is due to the formation of a covalent bond between the two polymers blended together because of the addition of the coupling agent(s). The values of the melt flow rate (MFR) also show an increase in molecular weight due to the formation of the block copolymer. For further details it is referred to Table I herein below.

E. Compatibilized blends

The block copolymer according to the present invention can be used for compatibilizing blends of polar with non-polar polymers selected from polar/non-polar thermoplastic elastomers, non-polar polyolefins/polar thermoplastic elastomers and non-polar thermoplastic elastomers/engineering resins.

Specific examples of polar thermoplastic elastomers are selected from thermoplastic polyurethanes, copolyesters and copolyamides as mentioned above.

Specific examples of non-polar thermoplastic elastomers are polypropylene/ethylene propylene diene dynamically vulcanized alloys, styrene/ethylene/butene block copolymers and blends thereof.

Specific examples of non-polar polyolefins are polypropylene and polyethylene and blends thereof.

Specific examples of engineering resins are polyamides, polybutylene terephthalates, polyethylene terephthalates, styrene acrylonitrile butadienes, polycarbonate polyphenylene oxides, polyphenylene sulfides, polyacetals and their blends.

Preferably the block copolymer compatibilizer according to the present invention is used for compatibilizing blends of polyolefins or polyolefin based DVAs with thermoplastic polyurethanes.

The polyolefin component includes various types of polyethylenes and polypropylenes, polybutylenes and the well known blends and copolymers thereof. Polypropylene is the preferred polyolefin. Polyethylene graft or random copolymers can also be used.

Preferred within this polyethylene group are the softer more elastic polyethylenes such as the low density (LDPE) and linear low density polyethylenes (LLDPE) with the latter being most preferred.

The polyolefin based dynamically vulcanized alloys are selected from polypropylene/crosslinked ethylene propylene diene DVA's, polypropylene/natural rubber DVA's, polypropylene/butyl rubber DVA's. Additionally, reference is made to the DVA's disclosed in WO-A-95/26380.

The thermoplastic polyurethanes correspond to those mentioned above in connection with the thermoplastic polyurethanes used for the block copolymer compatibilizer mentioned above.

The blends of polar and non-polar polymers comprise 2 to 98 percent by weight, preferably 10 to 90 percent by weight, most preferably 20 to 80 percent by weight of the polar polymer and 98 to 2 percent by weight, preferably 90 to 10 percent by weight, most preferably 80 to 20 percent by weight of the non-polar polymer, based on the total amount of the polar and non-polar polymers.

The compatibilized blends of the polar and non-polar polymers typically comprise 1 to 40, preferably 5 to 20 parts by weight of the block copolymer compatibilizer as defined above, based on 100 parts by weight of the blend of polar and non-polar polymer.

The introduction of the block copolymer compatibilizer according to the present invention into the blend has a significant effect on both, tensile strength and elongation at break of the compositions.

The compatibilized blends of a polar and a non-polar polymer comprising the block copolymer compatibilizer are prepared by melt-mixing the polymers together in the presence of the compatibilizer in an internal mixer, a single screw extruder, a co- or counter rotation twin-screw extruder, an open mill or any other type of equipment suitable and known in the art. The compatibilizer can also be added after the polymers have been molten and blended.

F. Adhesion improvement in thermoplastic elastomers

It has been found that the adhesion of thermoplastic elastomers to polar engineering resins can be improved by adding to the thermoplastic elastomer the block copolymer compatibilizer according to the present invention.

The thermoplastic elastomers are selected from polypropylene/crosslinked ethylene propylene diene DVA's, polypropylene/natural rubber DVA's, polypropylene/butyl rubber DVA's. Additionally, reference is made to the DVA's disclosed in WO-A-95/26380. Furthermore, styrene/ethylene/butene-block copolymers can be used as the thermoplastic elastomer.

The polar engineering resins onto which the adhesion of said thermoplastic elastomers can be improved are selected from polyamides, polybutylene terephthalate, polyethylene terephthalate, styrene acrylonitrile butadiene, polycarbonate polyphenylene oxides, polyphenylene sulfides and polyacetals.

In order to achieve this adhesion promoting effect the amount of the block copolymer is 1 to 40 weight percent, preferably 5 to 20 weight percent, based on the composition of thermoplastic elastomer and block copolymer.

G. Additives

Additives known in the art, such as fillers, oil, antioxidant, UV stabilizers, waxes, process aids such lubricants, can be added while making the block copolymers and the compatibilized blends. The amount of said additives is 0.05 to 50%, based on the total amount of blend, depending on the nature of the additives themselves.

The compatibilized blends of non-polar and polar thermoplastic elastomers can be used for instance for different applications in injection molding, extrusion on blow molding or calandering. The claimed compatibilizer can also be used as tie layer (bonding layer) between polar and non-polar polymers.

The present invention is further explained by the following examples.

EXAMPLES

In the examples the following abbreviations are used:

| | |
|---|---|
| PP = | polypropylene |
| PP-NHR = | amino modified polypropylene |
| TPU = | thermoplastic polyurethane |
| CA = | coupling agent |
| PP-MA = | polypropylene grafted with maleic anhydride |
| MFR = | melt flow rate |
| COPE = | copolyester |
| EAA = | ethylene acrylic acid copolymer |
| PP/EPDM DVA = | thermoplastic elastomer comprising polypropylene and ethylene/propylene-diene monomer terpolymer as dynamically vulcanized alloy |

The following measurement methods were used:

Modulus, Tensile at break, Elongation at break: ISO 37, type 2 (ASTM D 412)

Melt flow rate: ASTM D 1238

Shore hardness A and D, respectively: ASTM D 2240

Adhesion: is determined by taking a sheet of an engineering resin, e.g., ABS and a sheet of a thermoplastic elastomer containing the block copolymer according to the invention and pressing them together in a hot press (200° C.) under pressure (100 bar) for a period of two minutes. The adhesion is determined by manually trying to separate the two layers.

Table of compounds used in the examples

| | |
|---|---|
| Amino PP: | grafted polypropylene containing amino functional groups (Exxon) (experimental grade) |
| PRP 210: | polypropylene (Solvay) |
| Desmopan ® 786: | thermoplastic polyurethane of the polyether carbonate type (Bayer) |
| Grillbond EL6: | protected diisocyanate (EMS-Chemie) |
| Escor ® 5000: | ethylene acrylic acid copolymer (Exxon) |
| Exxelor ® PO 1015: | maleated polpropylene (Exxon) |
| Desmopan ® KA 8366: | thermoplastic polyurethane of the ester type (Bayer) |
| Desmopan ® 385: | thermoplastic polyurethane of the ester type (Bayer) |
| Hytrel ® 4275: | copolyester elastomer (Du Pont) |
| Milastomer 6030N: | thermoplastic elastomer with a Shore A hardness of 60 (Mitsui Chemical) |
| Mondur ® E 501: | diisocyanate (Mobay) |
| Pebax ® 2533 SN00: | polyether block amide (copolyamide, mp 148° C., Atochem) |
| Santoprene ® 201–64: | thermoplastic elastomer with a Shore A hardness of 64 (Advanced Elastomer Systems) |
| Santoprene ® 691-65 W221: | thermoplastic elastomer with a Shore A hardness of 65 (Advanced Elastomer Systems) |

Table 1 compares the properties of PP/TPU blends and of PP amine/TPU/coupling agent blends. The compositions which contain no compatibilizer have very poor properties reflecting the lack of compatibility and interfacial adhesion between the two polymers. For the compatibilized blends, there is a significant improvement in the mechanical properties. This is due to the formation of a covalent bond between the 2 polymers blended together due to the addition of the coupling agent. The values of the melt flow rate (MFR) also show an increase in molecular weight due to the formation of the block copolymer.

TABLE I

|  | C1 | 1 | C2 | 2 | C3 | 3 | C4 | 4 | C5 | 5 |
|---|---|---|---|---|---|---|---|---|---|---|
| Composition: | | | | | | | | | | |
| PP-NHR (1) | | 20 | | 40 | | 50 | | 60 | | 80 |
| PP (2) | 20 | | 40 | | 50 | | 60 | | 80 | |
| TPU1 (3) | 80 | 80 | 60 | 60 | 50 | 50 | 40 | 40 | 20 | 20 |
| CA1 (4) | | 1 | | 1 | | 1 | | 1 | | 1 |
| Properties: | | | | | | | | | | |
| Modulus 100% (MPa) | 3.7 | 7.6 | — | 9.8 | — | 10.6 | — | 11.5 | 14.0 | 13.2 |
| Tensile at Break (MPa) | 13.5 | 26.8 | 5.0 | 34.2 | 7.9 | 28.0 | 8.8 | 26.9 | 13.6 | 29.7 |
| Elongation at Break (%) | 497 | 495 | 82 | 567 | 52 | 548 | 33 | 531 | 139 | 610 |
| MFR (200° C./2.16 Kg)(g/10 min.) | 34 | 3 | 45 | 3.8 | 24 | 4.1 | 38 | 2 | 11 | 3.2 |

(1) Amino PP, Experimental grade EXXON
(2) PRP 210
(3) Desmopan 786
(4) Coupling agent, Grillbond EL 6

The MFRs of selected compositions are also given. If the same mechanism of compatibilization would take place, one should observe the about the same value. From the data given in Table II, the composition containing PP-Ma has a much higher MFR than the two others. This indicates that the amount of block copolymer formed during mixing is not important or that the chemical reaction which takes place degrades/reduces the molecular weight of one polymer.

TABLE II

|  | C6 | C7 | 6 | C8 | C9 | 7 | C10 | C11 | 8 | C12 | C13 | 9 |
|---|---|---|---|---|---|---|---|---|---|---|---|---|
| Compositions: | | | | | | | | | | | | |
| PP-NHR (1) | | 50 | 50 | | 50 | 50 | | 50 | 50 | | 50 | 50 |
| PP-Ma (5) | 50 | | | 50 | | | 50 | | | 50 | | |
| TPU1 (3) | 50 | 50 | 50 | | | | | | | | | |
| TPU2 (6) | | | | 50 | 50 | 50 | | | | | | |
| TPU3 (7) | | | | | | | 50 | 50 | 50 | | | |
| COPE (8) | | | | | | | | | | 50 | 50 | 50 |
| CA2 (9) | | | 1 | | | 1 | | | 1 | | | 1 |
| Properties: | | | | | | | | | | | | |
| Modulus 100% (MPa) | 10.6 | 10.6 | 11.1 | 9.8 | 9.7 | 10.2 | 11.3 | 10.6 | 10.7 | — | — | 14.3 |
| Tensile at Break (MPa) | 12.5 | 22.0 | 27.9 | 19.9 | 18.9 | 25.0 | 12.4 | 26.5 | 27.7 | 16.5 | 10 | 17.5 |
| Elongation at Break (%) | 227 | 583 | 655 | 552 | 658 | 678 | 377 | 586 | 718 | 13 | 13.9 | 613 |
| MPR (200° C./2.16 Kg) | 61 | 8.1 | 3.6 | | | | | | | | | |

(1)–(4) see Table I
(5) Exxelor PO 1015 (EXXON)
(6) Desmopan KA 8366
(7) Desmopan 385
(8) Hytrel 4275
(9) Mondur E 501

Table II also indicates that other TPUs can be used (copolyesters). Also covered in Table II are copolyesters.

Table III shows the properties of blends of ethylene acrylic acid copolymers (EAA) and TPU. It can be observed that the blends containing the coupling agent have much better mechanical properties because of the formation of the graft copolymers EAA-g-TPU. The effect of the compatibilization is mainly obvious at a EAA/TPU ratio from 60/40 most probably related to the amount of graft copolymers formed by EAA chain and/or the morphology of the blend.

TABLE III

|  | C14 | 10 | C15 | 11 | C16 | 12 | C17 | 13 |
|---|---|---|---|---|---|---|---|---|
| Compositions: | | | | | | | | |
| EAA1 (10) | 20 | 20 | 40 | 40 | 60 | 60 | 80 | 80 |
| TPU3 | 80 | 80 | 60 | 60 | 40 | 40 | 20 | 20 |
| CA1 | | 1.15 | | 2.3 | | 3.45 | | 4.6 |

TABLE III-continued

|  | C14 | 10 | C15 | 11 | C16 | 12 | C17 | 13 |
|---|---|---|---|---|---|---|---|---|
| Properties: | | | | | | | | |
| Tensile at Break (MPa) | 47.9 | 49.8 | 14.4 | 38.8 | 10.9 | 23.7 | 10.6 | 16.9 |
| Elongation at Break (%) | 629 | 587 | 296 | 563 | 303 | 437 | 298 | 345 |

(10) Escor 5000 (Exxon Chemical)

The block copolymers of the present invention are useful as compatibilizer in blends of PP or PP/EPDM DVAs and TPUs. Table IV gives the mechanical properties of these blends with or without compatibilizer. It can be seen that the introduction of the block copolymer has a significant effect on both tensile strength and elongation at break of the compositions.

TABLE IV

|  | C18 | 14 | C19 | 15 | C21 | 16 | C22 | 17 |
|---|---|---|---|---|---|---|---|---|
| Compositions: | | | | | | | | |
| PP/EPDM DVA1 (11) | 50 | 45 | | | | | | |
| PP/EPDM DVA2 (12) | | | 50 | 45 | | | | |
| PP/EPDM DVA3 (13) | | | | | 50 | 45 | | |
| PP (2) | | | | | | | 50 | 45 |
| TPU1 | 50 | 45 | 50 | 45 | 50 | 45 | 50 | 45 |
| Example 3 | | 10 | | 10 | | 10 | | 10 |
| Properties: | | | | | | | | |
| Modulus 100% (MPa) | 2.2 | 2.5 | 2.7 | 4.1 | 2.3 | 3.3 | — | 11.6 |
| Tensile at Break (MPa) | 2.5 | 4.1 | 2.2 | 11.8 | 4.7 | 13.8 | 5.7 | 13.0 |
| Elongation at Break (%) | 157 | 271 | 251 | 458 | 346 | 524 | 35 | 332 |

(11) Santoprene 201-64
(12) Santoprene 691-65W221
(13) Milastomer 6030N

This type of block copolymer can also be used to improve the adhesion of Santoprene onto various polar engineering resins. Table V gives the results of adhesion of Santoprene alone or blended with a block copolymer onto ABS. It can be seen that there is no adhesion when the PP/EPDM DVA is used alone whereas, good and even cohesive adhesion is obtained when the DVA has been blended with the block copolymer.

TABLE V

|  | C23 | 18 | 19 | 20 | 21 |
|---|---|---|---|---|---|
| Compositions: | | | | | |
| PP/EPDM DVA1 (11) | 100 | 80 | 80 | 80 | |
| PP/EPDM DVA2 (12) | | | | | 80 |
| Example 9 | | 20 | | | |
| Example 11 | | | 20 | | |
| Example 7 | | | | 20 | 20 |
| Adhesion | No | Yes | Yes | Yes | Yes Cohes. |

A co-coupling agent can also be used to prepare the graft copolymers. Table VI compares the properties of PP-b-TPU copolymers by reacting a maleic anhydride grafted PP with a TPU using a mixture of blocked diisocyanate and diamine as coupling agents. The way the coupling agents are added has also been varied. It can be seen that the way the block copolymer is prepared has some effect on the mechanical properties and the melt flow rate of the copolymer but that, whatever the procedure followed there is a significant improvement in the properties compared with the binary blend and compositions where only one coupling agent is used.

TABLE VI

|  | C24 | C25 | C26 | 22 | 23 | 24 |
|---|---|---|---|---|---|---|
| Compositions: | | | | | | |
| PP-Ma (14) | 50 | 50 | 50 | 50 | 50 | 50 |
| TPU1 | 50 | 50 | 50 | 50 | 50 | 50 |
| CA1 | | 0.95 | | 0.95 | 0.95 | 0.95 |
| CA3 (15) | | | 0.47 | 0.47 (a) | 0.47 (b) | 0.47 (c) |
| Properties: | | | | | | |
| Tensile at Break (MPa) | 14.2 | 12.6 | 10.2 | 18.1 | 15.8 | 22.2 |
| Elongation at Break (%) | 13 | 43 | 119 | 525 | 546 | 593 |

(14) Exxelor PO1015 Exxon
(15) Hexamethylene Diamine
(a) CA3 then CA1
(b) CA1 then CA3
(c) CA1 and CA3

Table VII shows the mechanical properties of block copolymers containing copolyamides. As is evident, the incorporation of coupling agent has a significant influence on the tensile strength at break.

TABLE VII

|  | C27 | 25 | C28 | 26 | C29 | 27 | C30 | 28 |
|---|---|---|---|---|---|---|---|---|
| Compositions: | | | | | | | | |
| EAA1 (16) | 20 | 20 | 40 | 40 | 60 | 60 | 80 | 80 |
| Copolyamide (17) | 80 | 80 | 60 | 60 | 40 | 40 | 20 | 20 |
| CA1 (18) | | 1.15 | | 2.3 | | 3.45 | | 4.6 |
| Properties: | | | | | | | | |
| Modulus 100% (MPa) | 3.8 | 4.1 | 4.8 | 5.2 | 6.1 | 6.4 | 7.2 | 7.5 |
| Elongation at Break (%) | 940 | 880 | 630 | 700 | 500 | 610 | 540 | 510 |
| Tensile Strength at Break (MPa) | 11.4 | 19.0 | 9.5 | 16.1 | 10.2 | 16.7 | 12.9 | 15.6 |

(16) Escor 5000 (Exxon)
(17) Pebax 2533 SN00 (Atochem)
(18) Grillbond EL6 (EMS)

We claim:
1. A blend comprising
   (a) 60% to 99% by weight, based on (a)+(b), of a non-polar thermoplastic elastomer, and
   (b) 1% to 40% by weight, based on (a)+(b), of a block copolymer comprising the reaction product of
      (i) 5% to 95% by weight, based on (i)+(ii), of an olefin copolymer having a functional group in the main or side chain thereof,
      (ii) 95% to 5% by weight, based on (i)+(ii), of a thermoplastic polyurethane, thermoplastic copolyester or thermoplastic copolyamide, and
      (iii) 0.05 to 5 parts by weight, based on 100 parts of (i)+(ii), of one or more isocyanates reactive with (i) and (ii).

2. The blend according to claim 1 wherein the non-polar thermoplastic elastomer is selected from the group consisting of polypropylene/ethylene propylene diene dynamically vulcanized alloys, and styrene/ethylene/butene-block copolymers.

3. The blend according to claim 1 wherein component (i) is polypropylene grafted with maleic anhydride, component (ii) is thermoplastic polyurethane, and component (iii) is a diisocyanate optionally in combination with a co-coupling agent.

* * * * *